D. C. KITCHING.
LAMP ADJUSTING PEDAL MECHANISM.
APPLICATION FILED MAY 10, 1915.
1,154,187.
Patented Sept. 21, 1915.
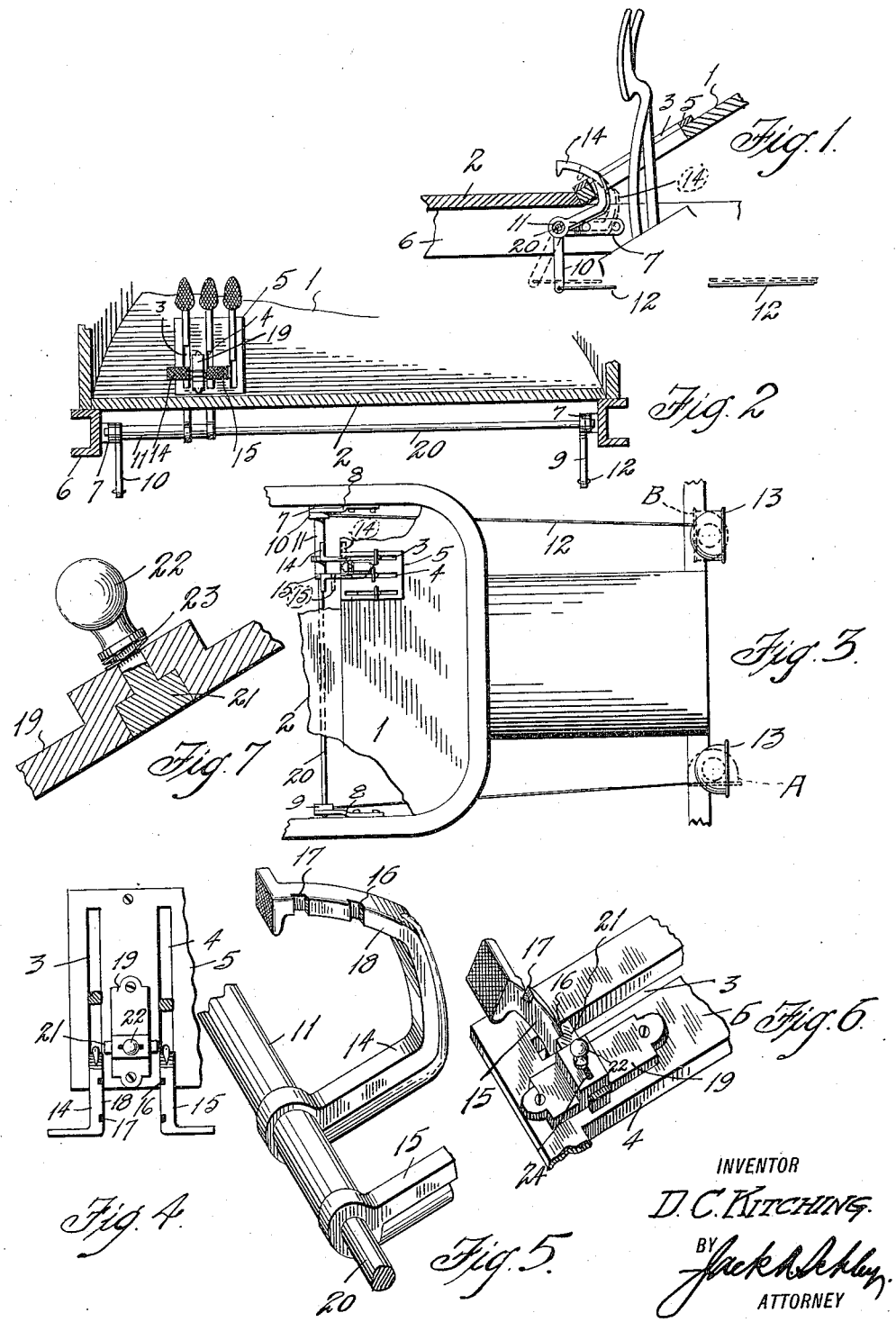

UNITED STATES PATENT OFFICE.

DAVID C. KITCHING, OF VALLEY MILLS, TEXAS.

LAMP-ADJUSTING PEDAL MECHANISM.

1,154,187.  Specification of Letters Patent.  Patented Sept. 21, 1915.

Application filed May 10, 1915. Serial No. 27,004.

*To all whom it may concern:*

Be it known that I, DAVID C. KITCHING, citizen of the United States, residing at Valley Mills, in the county of Bosque and State of Texas, have invented certain new and useful Improvements in Lamp-Adjusting Pedal Mechanisms, of which the following is a specification.

This invention pertains to new and useful improvements in lamp operating pedals for automobiles.

The object of the invention is to provide a pair of pedals for individually swinging the lamps of an automobile when said lamps are mounted for rotation as in my Letters Patent issued February 23rd, 1915, Number 1,129,207, and more particularly as shown in my co-pending application filed February 7th, 1914, Serial Number 817,213.

Another object is to provide a pedal mechanism constructed to be readily attached to an automobile without defacing the same and in such a manner as to be concealed except for the pedals; and to provide only a single shaft.

A further object is to provide a pedal mechanism having a pair of pedals arranged to operate in the usual pedal slots of the automobile to which it is attached.

Another feature resides in the provision of means for fastening the pedals in depressed positions whereby the lamps may be individually held in adjusted positions for directing the rays of light to one side or rearward for any desired period.

A still further object of the invention is to provide a device of the character described that will be strong, durable and efficient, and simple and comparatively inexpensive to construct, also one in which the several parts will not be likely to get out of working order.

With the above and other objects in view the invention has relation to certain novel features of construction and operation, an example of which is described in the following specification and illustrated in the accompanying drawings, wherein:

Figure 1 is a partial sectional view of the foot board of an automobile and showing my pedals in position, Fig. 2 is an elevation of the same, Fig. 3 is a plan view of a portion of an automobile showing the pedals connected to the lamps and indicating in dotted lines, adjusted positions of said lamps, Fig. 4 is a detail in plan of the pedal fastening device, Fig. 5 is a perspective view of the pedals, Fig. 6 is a perspective view showing one of the pedals depressed and fastened, and Fig. 7 is a partial longitudinal sectional view of the fastening device.

In the drawings the numeral 1 designates the foot board of an automobile and 2 the floor thereof. The foot board is inclined and has the usual pedal slots 3 and 4 surrounded by the metal frame plate 5. The usual sills 6 underlie the floor and foot board. These parts are present in the automobile and form no part of this invention.

To each sill 6 a bearing hanger 7 is attached and in certain makes of automobiles the bolts for fastening the hangers in place will be found already in place. The hangers are off-set toward the center of the automobile as indicated at 8 and receive the ends of a transverse rock shaft 20. Bearing against the inner sides of the hangers, or adjacent thereto, are a pair of arms 9 and 10 respectively, the former being fixed on the shaft and the latter being fixed on a sleeve 11 rotatively confined on the rock shaft. These arms depend and each has attached to its lower end a cable or other connection 12. These cables extend forward and are suitably attached to the rotating means (not shown) of the lamps 13, the latter being constructed along the lines set forth in the Letters Patent and co-pending application hereinbefore referred to. It is apparent that the arms are arranged to be swung individually and that by swinging one of said arms the lamp connected therewith will be swung without disturbing the other lamp.

A lamp adjusting pedal 14 is fixed on the sleeve 11 on which the arm 10 is also fixed, and this pedal extends through the slot 3; while a similar pedal 15 is fixed on the shaft 20 where it is abutted by the sleeve which it holds in place on said shaft. By depressing the pedal 14 the sleeve 11 is rocked on the shaft 20 and the arm 10 swung rearward which through the connection 12 rotatively displaces the left hand lamp 13 in proportion to the depression of said pedal. When the pedal 15 is depressed the shaft 20 is rocked whereby the arm 9 is swung rearward and the right hand lamp 13 rotatively displaced. It is apparent that either lamp may be swung according to the desires and requirements of the driver.

One of the novel features of the invention is a device for fastening the pedals in depressed positions. It is often desirable to hold one of the lamps (which are spring returned) in a certain position, as for instance to one side whereby the rays of light are directed at right angles to the automobile; or in a substantially reversed position whereby the rays of light are directed rearward to facilitate repairs or running the automobile rearward. There are many ways in which the pedals could be fastened and it is my intention to merely illustrate an embodiment of this feature.

Each pedal has a pair of notches 16 and 17 respectively in the curved portion 18 of its shank, which portion is concentric to its pivot point. Between the pedals on the plate 5 a housing plate 19 is secured and contains a bolt 21 arranged to slide transversely thereof. This bolt is of such length as when projected or slid to either side that it will engage the pedal notches on that side when the pedal is depressed to register the notches therewith. The notches 16 are positioned so that when engaged by the bolt the lamp connected with the pedal will be held at right angles as indicated at A in dotted lines in Fig. 3; while the notches 17 are located to hold the lamp in the position indicated in dotted lines at B in Fig. 3.

The bolt 21 has an upstanding foot piece 22 connected thereto through an elongated slot 24. A spring washer 23 is confined on the foot piece as shown in Fig. 7 and tends to bind the bolt in the housing whereby said bolt is frictionally held in the position to which it is moved. It is obvious that various numbers of notches may be used and the lamps fastened in different positions.

It is pointed out that one of the features of this invention is the construction of a pedal mechanism as an article of manufacture and ready and complete to install on an automobile without cutting, boring or otherwise preparing the automobile to receive the same. The construction, location and shape of the pedals 14 and 15 is also important as they must fit in the lower ends of the slots of the foot board 1 and when depressed must not interfere with the other pedals in said slots; for this reason the arcuate portions 18 are made concentric to the pivots points of the pedals and at no times does either pedal 14 and 15 project forward in its slot farther than its normal position.

The pedals being at the bottom of the slots 3 and 4 and overhanging the floor 2 are in position to be operated by the heels of the driver and also may be operated without removing the feet from the other pedals thereby giving the driver absolute control of the lamps and automobile from one position of the feet.

What I claim, is:

1. As an article of manufacture, a lamp adjusting pedal mechanism including, a pair of pedals, a rock shaft, a sleeve rotatively confined on the shaft, one of said pedals being fixed on the shaft and the other pedal being fixed on the sleeve, hangers supporting the shaft and adapted to be attached to the sills of an automobile, an arm fixed on the shaft, and a second arm fixed on the sleeve, said pedals being positioned on their parts so as to lie at the bottoms of the usual pedal slots of an automobile and having arcuate depressible portions concentric to their pivot points.

2. The combination with the floor, sills and foot board of an automobile and the pedal slots of the foot board; of an attachable lamp adjusting mechanism including; a pair of hangers constructed to be attached to the sills; a shaft rotatively mounted in the hangers, said hangers and shaft being disposed under the floor and foot board; a sleeve rotatively confined on the shaft; a lamp operating arm fixed on the shaft; a second lamp operating arm fixed on the sleeve; a pedal fixed on the shaft; a second pedal fixed on the sleeve; the pedals projecting through the foot board slots.

3. The combination in a lamp adjusting pedal mechanism of a pair of pedals, a rock shaft, a sleeve rotatively confined on the shaft, one of said pedals being fixed on the shaft and the other pedal being fixed on the sleeve, hangers constructed to be attached to an automobile below the floor thereof, said hangers supporting the shaft, an arm fixed on the sleeve, and a second arm fixed on the shaft, said pedals being positioned on their parts so as to lie in the usual pedal slots of an automobile floor and having curved depressible portions.

4. The combination with the floor, sills and foot board of an automobile and the pedal slots of the foot board; of an attachable lamp displacing mechanism including a pair of hangers constructed to be attached to the sills; a shaft rotatively mounted in the hangers, said hangers and shaft being disposed under the floor and foot board; a sleeve rotatively confined on the shaft; a lamp operating arm fixed on the shaft; a second lamp operating arm fixed on the sleeve; a pedal fixed on the shaft; a second pedal fixed on the sleeve; the pedals projecting through the foot board slots; and means for fastening either pedal in a depressed position.

In testimony whereof I affix my signature.

DAVID C. KITCHING.